(12) United States Patent
Georges et al.

(10) Patent No.: US 10,108,070 B2
(45) Date of Patent: Oct. 23, 2018

(54) RESONANT-MICROCHIP-CAVITY-BASED SYSTEM FOR GENERATING A LASER BEAM VIA A NONLINEAR EFFECT

(71) Applicant: OXXIUS, Lannion (FR)

(72) Inventors: Thierry Georges, Perros Guirec (FR); Nicolas Landru, Pleumeur Bodou (FR)

(73) Assignee: OXXIUS, Lannion (FR)

( * ) Notice: Subject to any disclaimer, the term of this patent is extended or adjusted under 35 U.S.C. 154(b) by 0 days.

(21) Appl. No.: 15/507,618

(22) PCT Filed: Aug. 19, 2015

(86) PCT No.: PCT/EP2015/069016
§ 371 (c)(1),
(2) Date: Feb. 28, 2017

(87) PCT Pub. No.: WO2016/034416
PCT Pub. Date: Mar. 10, 2016

(65) Prior Publication Data
US 2017/0307956 A1 Oct. 26, 2017

(30) Foreign Application Priority Data
Sep. 5, 2014 (FR) ..................... 14 58367

(51) Int. Cl.
*G02F 2/02* (2006.01)
*G02F 1/35* (2006.01)

(52) U.S. Cl.
CPC ............ *G02F 1/3501* (2013.01); *G02F 1/353* (2013.01); *G02F 2001/3503* (2013.01); *G02F 2001/3542* (2013.01); *G02F 2001/3546* (2013.01)

(58) Field of Classification Search
None
See application file for complete search history.

(56) References Cited

U.S. PATENT DOCUMENTS 4,953,166 A * 8/1990 Mooradian ......... H01S 3/09415
372/21
5,027,361 A * 6/1991 Kozlovsky ............... G02F 1/37
359/328
(Continued)

FOREIGN PATENT DOCUMENTS

EP 0503929 A2 * 9/1992 ............ G02F 1/37
EP 0798824 A2 10/1997
(Continued)

OTHER PUBLICATIONS

French Search Report from French Patent Application No. 1458367, dated Jul. 6, 2015.
(Continued)

*Primary Examiner* — Rhonda Peace
(74) *Attorney, Agent, or Firm* — Greer, Burns & Crain, Ltd.

(57) ABSTRACT

A system is provided for generating a laser beam via non-linear effects, including: a monofrequency continuous-wave laser source; and an external resonant cavity referred to as a microchip cavity. The microchip cavity is composite insofar as it is a unitary assembly of a plurality of materials g: at least one nonlinear crystal; an entrance mirror; a concave mirror deposited on a material fixed to the nonlinear crystal—the material on which the concave mirror is deposited is different from the constituent material of the nonlinear crystal; a first thermoelectric module for controlling the temperature of the nonlinear crystal; and at least one second thermoelectric module for controlling at least the temperature of the material on which the concave mirror is deposited.

13 Claims, 3 Drawing Sheets

(56) References Cited

U.S. PATENT DOCUMENTS

| | | | | |
|---|---|---|---|---|
| 5,038,352 | A * | 8/1991 | Lenth | H01S 5/141 359/326 |
| 5,093,832 | A | 3/1992 | Bethune et al. | |
| 5,581,395 | A * | 12/1996 | Tonosaki | G02F 1/3551 359/326 |
| 5,999,547 | A | 12/1999 | Schneider et al. | |
| 6,173,001 | B1 * | 1/2001 | Zayhowski | G02B 5/08 372/108 |
| 6,259,711 | B1 * | 7/2001 | Laurell | H01S 3/0627 372/102 |
| 6,456,424 | B1 * | 9/2002 | Arbore | G02F 1/39 359/330 |
| 6,654,392 | B1 | 11/2003 | Arbore et al. | |
| 6,963,443 | B2 * | 11/2005 | Pfeiffer | G02F 1/39 359/330 |
| 7,457,330 | B2 * | 11/2008 | Luo | H01S 3/0627 372/21 |
| 7,535,937 | B2 * | 5/2009 | Luo | G02F 1/3534 372/105 |
| 7,570,676 | B2 * | 8/2009 | Essaian | H01S 3/113 372/21 |
| 9,515,448 | B2 * | 12/2016 | Stultz | H01S 3/0627 |
| 2017/0176838 | A1 * | 6/2017 | Hu | |
| 2017/0307956 | A1 * | 10/2017 | Georges | G02F 1/3501 |

FOREIGN PATENT DOCUMENTS

| | | | | |
|---|---|---|---|---|
| EP | 2466372 A1 * | 6/2012 | | G02F 1/3501 |
| WO | 00/71342 A1 | 11/2000 | | |

OTHER PUBLICATIONS

International Search Report from International Patent Application No. PCT/EP2015/069016, dated Nov. 3, 2015.

Juwiler et al. "Efficient Quasi-Phase-Matched Frequency Doubling with Phase Compensation by a Wedged Crystal in a Standing-Wave External Cavity" Optics Letters (1999), 24(17), p. 1236-1238.

Kozlovsky et al. "Efficient Second Harmonic Generation of a Diode-Laser-Pumped CW Nd:YAG Laser Using Monolithic MgO: LiNbO3 External Resonant Cavities" IEEE Journal of Quantum Electronics (1988), 24(6), p. 913-919.

Neuhaus, Rudolf. "Diode Laser Locking and Linewidth Narrowing" Toptica Photonics AG Brochure, retrieved Jul. 6, 2015 <http://www.toptica.com/fileadmin/user upload/products/Photonicals/Spectroscopy_Cells/toptica_AP_1012_laser_locking_2009_09.pdf>.

* cited by examiner

RESONANT-MICROCHIP-CAVITY-BASED SYSTEM FOR GENERATING A LASER BEAM VIA A NONLINEAR EFFECT

BACKGROUND

The present invention relates to the generation of new wavelengths by nonlinear effect, in particular for continuous-wave lasers of low or medium power (typically <5 W).

Nonlinear processes are very practical means of generating wavelengths that are not easily accessible from more common wavelengths. Second order generating processes such as second harmonic generation or sum and difference frequency generation are known. Third order generating processes are also known such as, for example, stimulated Raman scattering, inter-alia.

For example, it is quite easy to produce lasers at 1064 nm, the materials and optical pumps necessary for this being known to those skilled in the art and available thereto. By second harmonic generation, it is possible to obtain an emission at 532 nm, then an emission at 266 nm via a second stage of second harmonic generation or an emission at 355 nm by summing the frequencies of the fundamental wave (1064 nm) and the doubled wave (532 nm).

For any laser assembly, it is accepted that its efficiency, representing the output power as a function of the pump power, must be optimized.

However, the efficiency of nonlinear processes depends on the intensity of the optical signals. It is very high (often higher than 50%) with laser emissions originating from Q-switched lasers the peak powers of which generally exceed a kW. Many commercial devices have been available for a long time.

This efficiency is in general low with conventional nonlinear crystals and optical powers of about a few watts or less.

By way of example, using one of the most efficient materials for second harmonic generation at 1064 nm, KTP, the conversion efficiency hardly reaches 0.02% with a power of 1 W at 1064 nm focused into a 50 μm beam at the center of a 5 mm-long KTP crystal. A 200 ρW emission at 532 nm results. This efficiency is even lower for second harmonic generation of an emission at 532 nm in BBO, to produce an emission in the deep UV (266 nm).

To increase the efficiency, it is possible to envision decreasing the size of the beam by further focusing. However, this decreases the useful nonlinear crystal length, because of the strong divergence of the beam.

Recent work has allowed the efficiency of certain nonlinear crystals to be improved. Quasi-phase matching developed on lithium niobate (ppLN) or KTP (ppKTP) allows conversion efficiencies of about 1% to be obtained for 1 W of signal at 1064 nm. However, these materials are not for example available in the UV. ppSLT exists for frequency summation between 1064 nm and 532 nm, but its efficiency is not very high.

The most effective way of enhancing the nonlinear effect is to include the nonlinear crystal in a resonant cavity resonant at the wavelength of the fundamental wave.

This is the case when the nonlinear crystal is included in the laser cavity. Solid-state lasers emitting at 532 nm or at 561 nm are an example of the inclusion of a nonlinear crystal in the laser cavity. For example, Nd:YAG pumped at 808 nm is an amplifier at 1064 nm or 1123 nm.

Intracavity doubled argon (gas) lasers, for example emitting at 244 nm, are another example thereof.

When it is not possible to insert the nonlinear crystal into the laser cavity, and if the laser is single-frequency, it is possible to inject the laser emission into an external cavity and to adjust the optical length of the external cavity so as to make it resonant with the laser emission. At resonance, the power of the fundamental wave is typically amplified by a factor S (ratio of the intra- and extra-cavity power, called la facteur de surtension in French). The phase width of the resonance is about $2\pi/S$. In the prior art, this has conventionally been how a continuous-wave source at 266 nm has been obtained.

Finesses of about 30 to 100 are usually employed in nonlinear external cavities in order to achieve conversion efficiencies of from 10% to more than 30%.

External cavities are usually produced by assembling and aligning at least two mirrors (Fabry-Perot cavity) and often four mirrors (bow-tie ring cavities). In such prior-art systems, any mechanical movement due for example to a mechanical vibration induces a modification of the phase of the optical wave. A movement $\delta$ of one of the mirrors of a Fabry-Perot cavity induces a phase variation of $4\pi\delta/\lambda$, which must be much smaller than $2\pi/S$ if it is desired to avoid fluctuations in the power of the fundamental wave in the cavity (and therefore of the wave generated by the nonlinear effect). Therefore, for the external cavity to operate correctly, $\delta \ll \lambda/2S$. For a wavelength of 500 nm and a finesse of 50, the mechanical fluctuations must therefore respect $\delta \ll 5$ nm! For a cavity of 50 mm length, this amounts to a relative stability of better than $10^{-7}$. This mechanical stability is unachievable with conventional mechanical systems.

FIG. 1 shows a prior-art system for generating laser beams by nonlinear effect. A bow-tie ring cavity comprising four mirrors and an LBO crystal may be seen. The length of the cavity is servocontrolled to the power of the pump, i.e. the incident laser beam. To do this, some of the incident beam is sampled by reflection from a first mirror. The sampled beam is then detected by one or more photodetectors via a quarter-wave plate and optionally a beam splitter. The photodetectors supply a processing unit that generates a control signal for controlling the movement of a second mirror by means of a piezoelectric module so as to modify the length of the cavity.

In the prior art, the cavities used for second harmonic generation are therefore electromechanically servocontrolled, in general piezoelectrically and using an error signal generating method such as that of Hansch-Couillaud (such as illustrated in FIG. 1) or that of Pond-Drever-Hall.

However, external cavities have technological limitations.

The piezoelectric actuators used require voltages of about a kV. The associated electronics become complex and expensive as soon as the passband frequencies are higher than of the order of a kHz. The maximum voltage of the piezoelectric actuator corresponds to the maximum intensity of mechanical vibration that it is possible to correct. The maximum frequency corresponds to the maximum frequency of vibration that it is possible to correct. Therebeyond, the servocontrol system falls out of sync.

It is known from the publication W. Kozlovsky et al., "*Efficient Second Harmonic Generation of a Diode Laser Pumped CW Nd:YAG laser using monolithic MgO:LiNbO$_3$ external resonant cavities*", IEEE JQE vol 24, p 913, that when the fundamental source is insensitive to vibrations (for example with a monolithic laser) and the external cavity is also monolithic, it is possible to "thermally" servocontrol the external cavity to the frequency of the fundamental source. This solution is elegant and easy to implement, assuming it is possible to produce the external cavity and the source.

However, monolithic external cavities themselves also have limitations.

Firstly, external cavities are closed by two reflective mirrors and require at least one focal element. In a monolithic external cavity, the mirrors are deposited directly on the nonlinear crystal and the focusing element is obtained with a polish with a curvature. Many nonlinear crystals and in particular those that are effective in the UV such as BBO have thermal expansion coefficients that are too high for it to be possible to deposit dielectric mirrors thereon. Furthermore, they are often difficult to polish (hygroscopicity, etc.) and this makes it difficult to achieve a polish with a radius of curvature. This polish is thus expensive and of poor quality. It is therefore often impossible or not economical to produce an external monolithic cavity.

Secondly, many nonlinear crystals have a high sensitivity to temperature. This therefore requires a preciser control of temperature.

Thirdly, when the temperature acceptance of the nonlinear crystal is low, it may not be possible to find a temperature that makes the cavity resonant and that is located in the phase matching range of the nonlinear crystal.

Fourthly, many nonlinear crystals exhibit substantial walk-off, limiting the nonlinear conversion efficiency and degrading the quality of the converted beam.

Finally, since servocontrol of temperature is naturally slow, it is difficult to avoid oscillations in the power output from the external cavity.

The objective of the present invention is to mitigate the aforementioned drawbacks by providing an external cavity that is highly effective. Another aim of the invention is to make it possible to generate wavelengths that are unusual for a low-power continuous-wave laser, in particular wavelengths in the UV.

SUMMARY

At least the aforementioned objectives are achieved with a system for generating a laser beam by nonlinear effect, comprising:
- a single-frequency continuous-wave laser source for generating a fundamental wave, and
- a resonant external cavity receiving this fundamental wave, called the microchip cavity.

According to the invention, the microchip cavity is composite in so far as this microchip cavity is a unitary assembly of a plurality of materials comprising:
- at least one nonlinear crystal,
- an entrance mirror,
- a concave mirror deposited on a material that is fastened to the nonlinear crystal; the material on which the concave mirror is deposited is different from the constituent material of the nonlinear crystal, and
- a first thermoelectric module for controlling the temperature of the nonlinear crystal and at least one second thermoelectric module for controlling at least the temperature of the material on which the concave mirror is deposited.

The single-frequency continuous-wave laser source generates a fundamental wave that is injected into the external cavity, the latter being resonant at the frequency of the fundamental wave between the two mirrors.

The present invention thus defined allows frequency conversion of a laser source by a microchip external cavity.

The laser source may be an, optionally amplified, laser diode, a microchip solid-state laser pumped by diode or any type of laser that is sufficiently stable in frequency and insensitive to mechanical vibrations.

With the system according to the invention, it is now possible, with present-day continuous-wave laser sources, which essentially emit in the IR, to use many nonlinear crystals and in particular crystals that are efficient in the UV such as BBO, LBO, or BiBO, which have thermal expansion coefficients that are too high to be able to deposit dielectric mirrors thereon; at least the concave mirror may advantageously be deposited on a material that is different from that of the nonlinear crystal.

According to one advantageous feature of the invention, the temperature of the constituent material of at least the concave mirror is controlled so as to optically modify the cavity and to obtain the resonance whatever the configuration.

Moreover, the materials of the entrance and exit mirrors may be glasses or crystals, with a thermal expansion coefficient lower than that of the constituent material of the nonlinear crystal and a higher polishability than that of the constituent material of the nonlinear crystal. These two features are preferably implemented together; however, depending on the desired objectives and the actual materials, each may be implemented independently of the other. With a material that can be easily polished, it is easily possible to deposit mirrors, in particular mirrors with a curvature.

With at least two types of crystals in the cavity and control of at least two different temperatures it is possible to precisely adjust the temperature of the nonlinear crystal to achieve a phase match and the temperature of the second crystal or glass to achieve the resonance of the cavity. The assembly in general also decreases the sensitivity of the resonance to the temperature of the nonlinear crystal.

When the birefringent phase-matching method is used, which is most commonly the case for the generation of UV for example, the nonlinear crystal is cut off the crystal axes and exhibits spatial walk-off in at least one polarization state. It is known to compensate for this effect by cutting the crystal into a plurality of pieces along its length and by rotating by 180°, about the axis of propagation of the signal, two consecutive pieces. Once the crystal has been cut and rotated, it is reassembled. The nonlinear crystal such as defined in the present invention may be such a cut, rotated and then reassembled crystal. It is also considered to be a microchip assembly.

In a Fabry-Perot cavity, the converted wave is emitted in both directions. It is standard to reflect one of the emissions from one of the two mirrors in order to add the two beams. However, this addition is an amplitude addition and therefore occurs whether the beams are in phase or out of phase. If the mirror is located immediately at the exit of the nonlinear crystal, the added beams are automatically in phase. Otherwise, according to the invention, it is possible to tune the temperature of the crystal or glass bearing this mirror in order to adjust the phase of the reflected beam.

In addition in particular to the above, the system according to the invention may advantageously comprise a processing unit configured to servocontrol the temperature of the nonlinear crystal and the temperature at least of the material on which the concave mirror is deposited to the frequency of the laser source. Preferably, the processing unit may be configured to lock the temperature servocontrol only to at least one side of the resonant curve. This in particular solves a problem due to the fact that it is impossible to lock the servocontrol to the apex of the curve. Specifically, if there is any absorption, the resonant curve of the Fabry-Perot resonator may become asymmetric and it is possible for the servocontrol to desync from the apex. However, when there is no hysteresis, it is possible to lock the servocontrol to the apex.

In addition in particular to one or more of the preceding features and with the aim of stabilizing the output power, the processing unit may furthermore be configured to carry out a servocontrol using physical effects that are more rapid than the temperature of the crystals. For example, when the nonlinear crystal is an electro-optic crystal, the processing unit may be configured to carry out an electro-optic servocontrol by applying a voltage directly to the nonlinear crystal. Such an application of voltage to an electro-optic crystal (sensitive to the Pockels effect) modifies the phase of the cavity almost instantaneously.

Still with the same objective, the processing unit may also be configured to servocontrol the phase of the fundamental wave in the external cavity by modifying the frequency of the single-frequency continuous-wave laser source. This frequency may be modified by various means such as, for example, by modifying the current of an optical pump supplying the single-frequency continuous-wave laser source or by modifying the current of a semiconductor laser used by way of said single-frequency continuous-wave laser source.

The variation in the current of the optical pump or of the semiconductor laser may be used to make the frequency of the fundamental wave and therefore the phase of the external cavity (which depends on frequency) rapidly vary.

Other types of rapid servocontrol may be used. In particular, any physical effect that modifies the frequency of the emitting laser or the phase of the fundamental wave in the external cavity and that is rapider than thermal servocontrol (a few Hz to a few hundred Hz is sufficient) may be combined with the temperature servocontrol to stabilize the output power.

With the invention, it is thus envisioned to combine a temperature servocontrol that is not stable enough with a rapid low-magnitude servocontrol.

Advantageously, the microchip cavity may be an external cavity forming a Fabry-Perot interferometer, an external ring cavity or an external cavity forming an interferometer the reflectivity of which is maximum during resonance. Other cavity configurations may be employed.

In addition in particular to one or more of the preceding features, the material on which the concave mirror is deposited comprises silica or fused silica (synthetic amorphous silicon dioxide, also denoted UV silica) or sapphire. These materials are easy to polish and have quite low thereto-optic coefficients (dn/dT) and thermal expansion coefficients.

According to one advantageous embodiment of the invention, the nonlinear crystal and the material on which the concave mirror is deposited are assembled by direct bonding (molecular bonding) or by bonding using a sol-gel process, or by any other means allowing a unitary assembly of the various crystals or glasses to be obtained.

According to the invention, provision may be made for a configuration in which the nonlinear crystal is of parallelepipedal shape comprising two opposite faces to which the two mirrors, i.e. the entrance and exit mirrors, are respectively fastened, the cross section of each of the two mirrors being larger than or equal to the cross section of the nonlinear crystal so that said two opposite faces of the nonlinear crystal are completely covered respectively by the two mirrors.

Provision may moreover be made for a variant in which the nonlinear crystal is of parallelepipedal shape comprising two opposite faces to which the two mirrors, i.e. the entrance and exit mirrors, are respectively fastened, the cross section of the entrance mirror being smaller than the cross section of the nonlinear crystal so that the entrance face of the nonlinear crystal is not completely covered by the entrance mirror.

According to the invention, the entrance mirror may be deposited directly on the constituent material of the nonlinear crystal or indeed on another material different from that of the nonlinear crystal. In the latter case, the elements are assembled by direct bonding or by bonding using a sol-gel process.

BRIEF DESCRIPTION OF THE DRAWINGS

Other advantages and features of the invention will become apparent on examining the detailed description of one completely nonlimiting embodiment and the appended drawings, in which.

DETAILED DESCRIPTION

Although the invention is not limited thereto, examples of linear external cavities forming Fabry-Perot interferometers will now be described. Any microchip cavity having a ring configuration or forming another type of interferometer is obviously possible. These cavities are described such as they implement the nonlinear frequency doubling effect, but obviously any other effect requiring the resonance of the external cavity may be applied: sum or difference of frequencies, parametric oscillator (OPO), Raman laser, etc.

Figure 1:
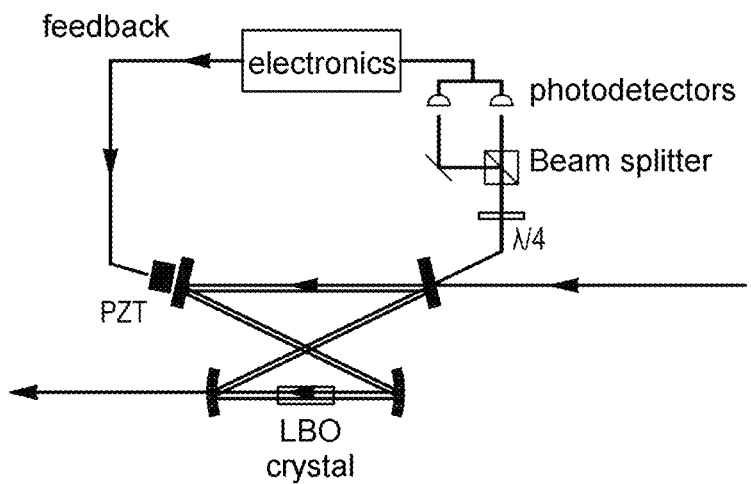
FIG. 1 is a schematic view of a resonant external cavity according to the prior art.
Figure 2:
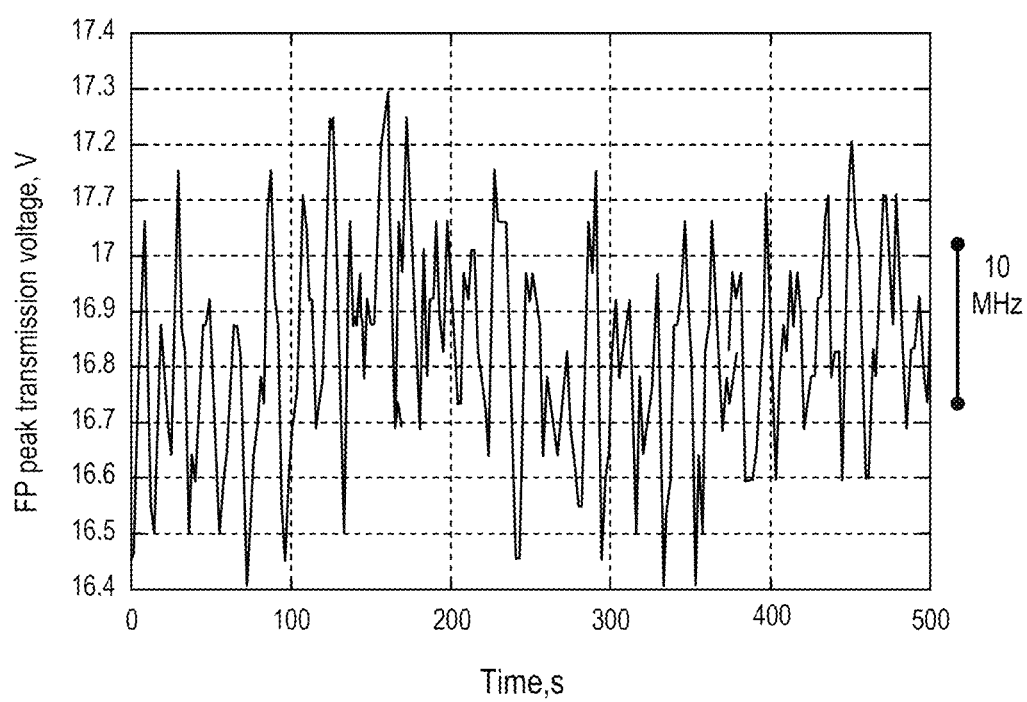
FIG. 2 is a graph illustrating the frequency fluctuations of a microchip laser emitting at 561 nm measured by a Fabry-Perot interferometer.
Figure 3:
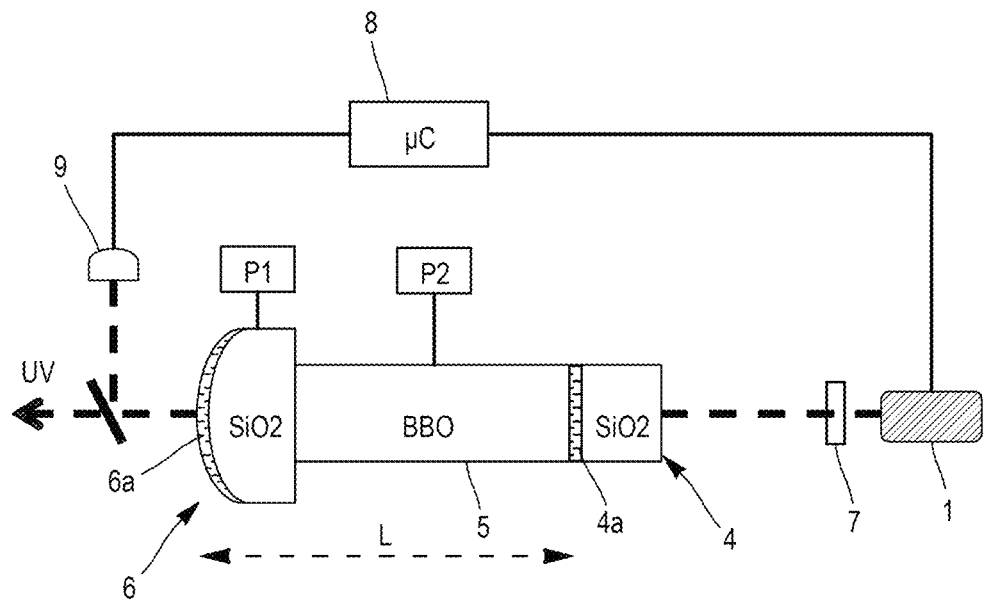
FIG. 3 is a schematic view of a nonlinear conversion system comprising a composite resonant external cavity according to the invention.

A first exemplary embodiment is described in FIG. 3 for the production of a laser system emitting at 280.5 nm. The continuous-wave laser source 1 emits at 561 nm and produces the fundamental wave 2. This continuous-wave laser 1 is formed by an assembly of an Nd:YAG crystal amplifier, a quartz crystal, a polarizer and a crystal doubler. The frequency oscillations of this laser, as may be seen in FIG. 2, show that the amplitude variations are about 20 MHz and slow (period >5 s). This confirms the insensitivity of this type of source to vibrations.

This fundamental wave 2 is injected into a microchip external cavity 3 forming a Fabry-Perot interferometer according to the invention. The cavity is produced by assembling by direct bonding a material 4 that is a substrate made of silica, and a nonlinear BBO crystal of 10 mm length that is cut for type I phase tuning between the fundamental wave at 561 nm and the doubled wave at 280.5 nm. An entrance mirror 4a is deposited on the silica substrate 4 on the end of this substrate making direct contact with the nonlinear crystal, this having allowed it to be more easily conceived than if it had been necessary to deposit it directly on the BBO (this however remaining one embodiment that is envisionable for certain applications). The silica has been treated to produce a reflective effect of 93% for the wave at 561 nm and a reflective effect >95% for the wave at 280.5 nm.

The cavity is closed by virtue of a concave exit mirror 6 made of silica of maximum reflectivity at 561 nm and minimum reflectivity at 280 nm. The radius of curvature is 100 mm. This concave mirror 6a is placed on one end of the material 6, which is a substrate made of silica. The material 6 is a substrate with a planar entrance face and an exit face that is curved on the side opposite the nonlinear crystal, the mirror 6a being deposited on the exterior side of the curved face. It will be noted that the external cavity is composite since the two mirrors are deposited on silica substrates, i.e. substrates made of a material that is different from that of the nonlinear crystal, which is made of BBO.

The first mirror makes contact with the BBO, so that the cavity starts directly on the BBO. The length L of the resonant cavity is 20 mm. An optical isolator 7 prevents the wave reflected by the Fabry-Perot cavity from returning to the continuous-wave laser 1 and destabilizing it.

The system is designed so as to carry out a double servocontrol: a servocontrol of temperature via two Peltier devices, P1 for the mirror 6a and P2 for the nonlinear crystal, which devices are controlled by a processing unit 8. The second servocontrol is electro-optic. To do this, the processing unit 8 is connected to the continuous-wave laser 1 and receives from a rapid photodetector 9 a signal representative of the UV wave output at 280.5 nm.

The processing unit 8 comprises at least for example one microcontroller and conventional software and hardware components allowing it to interface with the various components of the system and to implement servocontrol algorithms.

With 300 mW at 561 nm, an output power of more than 20 mW at 280.5 nm has been obtained.

Figure 4:
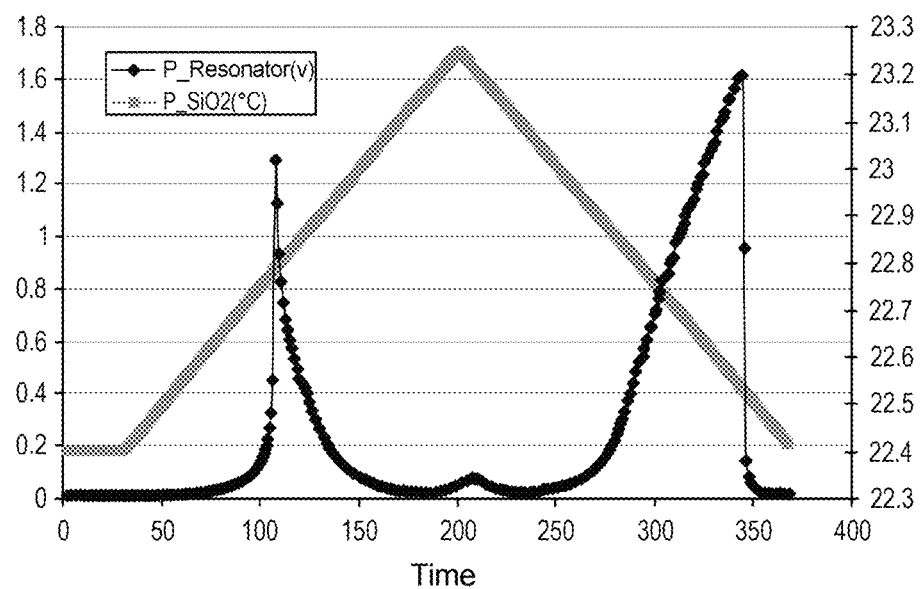
FIG. 4 is a graph illustrating the power, measured by photodiode, (in V) output from a microchip external cavity according to the invention formed from a BBO crystal and mirrors deposited on silica.

The curves in FIG. 4 illustrate the power, measured by photodiode, (in V) output from a microchip external cavity formed by the BBO crystal and mirrors deposited on silica. The temperature of the silica is first increased from 22.4° C. to 23.25° C. then decreased to the initial temperature. It will be noted that the resonant curve of the external cavity is asymmetric because of a slight absorption and has a hysteresis differentiating the increase and the decrease in temperature.

These effects prevent the servocontrol from being locked to the apex of the curve. Provision may then be made to lock the servocontrol to the side of the curve. The servocontrol works (there is no desynchronization) but it is in particular observed that the power is not very stable with variations of +/−10%. Thus, the thermal servocontrol must be locked to the side of the resonance and is therefore not stable enough. An additional system may then advantageously be added to stabilize the output power.

Figure 5:
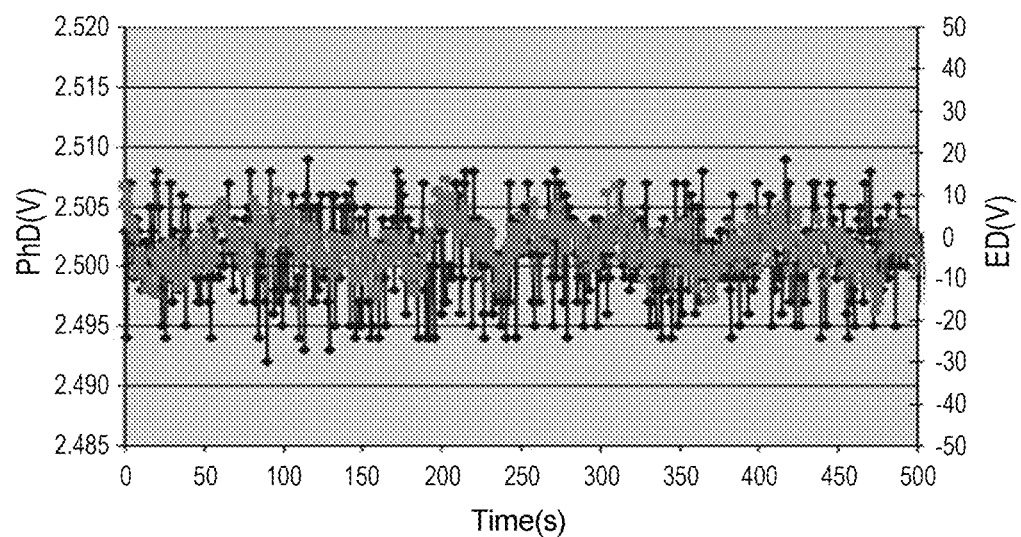
FIG. 5 is a graph illustrating the power, measured by photodiode, (in V) output from the same microchip external cavity as in the preceding figure with electro-optic servocontrol of the BBO.

For the stabilization of the output power, provision may be made to use the electro-optic effect of the BBO crystal. A signal of less than 40 V peak is enough to decrease the power fluctuations to less than 0.2% rms. In FIG. 5, the curves illustrate the power, measured by photodiode, (in V) output from the same microchip external cavity with electro-optic servocontrol of the BBO. It is also shown that varying the pump current of an optical pump of the continuous-wave laser 1 emitting at 561 nm induces a frequency variation that is sufficiently rapid to achieve the same result. These two examples are obviously not exhaustive.

It may be advantageous according to the invention to produce an interferometer the reflectivity of which is maximal during resonance. This interferometer may thus match an a priori multimode diode to one resonant mode. This makes it possible to produce, simply, in particular a deep UV source at 244 nm from a GaN diode at 488 nm or at 225 nm from a GaN diode at 450 nm.

Figure 6:
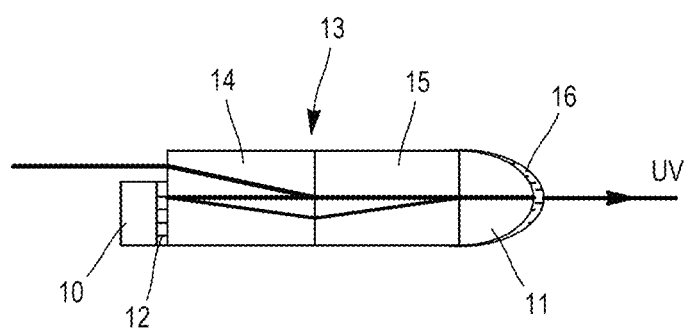
FIG. 6 is a schematic of an external cavity according to the invention in the configuration of an interferometer the reflectivity of which is maximal during resonance.

Such an interferometer may be produced in the way illustrated in FIG. 6 for the case of a cavity for frequency doubling from 488 nm to 244 nm. A planar entrance mirror 12, this entrance mirror not entirely covering the nonlinear crystal 13 and reflecting at 488 nm and 244 nm, may be seen. A curved exit mirror 16 that is reflective at 488 nm and transmissive at 244 nm may also be seen. The substrate 11 on which the concave mirror 16 is deposited, and optionally the substrate 10 on which the planar mirror 12 is deposited, is made from a material that is different from that of the nonlinear crystal. The nonlinear crystal, which is made of BBO, is in two pieces 14 and 15 that are rotated about the propagation axis by an angle comprised between 170 and 179.5° or 180.5° and 190°. A value close to 180° ensures the compensation of the spatial walk-off associated with propagation along the extraordinary (e) axis. A value slightly different from 180° weakly couples the extraordinary (e) wave of the first BBO crystal to the ordinary (o) wave of the second crystal. The phase match is obtained between the ordinary wave (o) at 488 nm and the extraordinary (e) wave at 244 nm.

It is the (e) wave that enters into the microchip external cavity. The reflectivity is maximum when the external cavity is resonant.

The present invention therefore relates to a very effective system for nonlinear conversion (SHG, SFG, DFG, Raman, parametric oscillation, etc.) of a single-frequency continuous-wave source in a resonant external cavity servocontrolled to the frequency of the source.

Of course, the invention is not limited to the examples just described and many modifications may be made to these examples without departing from the scope of the invention. The continuous-wave laser source may be a single-frequency (DFB or DBR) laser diode, potentially one amplified by an external (optionally fiber) amplifier. It may be a single-frequency GaN diode.

The nonlinear effect implemented may nonlimitingly be one of those described below:
  a frequency doubling effect,
  a frequency summing effect: the first frequency being resonant in the external cavity according to the invention; the second (nonresonant) frequency passing through the external cavity, this second frequency originating from a laser oscillator that will possibly be contained in the external cavity, etc.
  a parametric amplifier/oscillator effect: the external cavity also being a cavity at the parametric wavelengths or the parametric cavity containing the external cavity,
  a Raman amplifier/oscillator effect.

The invention claimed is:
1. A system for generating a laser beam by nonlinear effect, comprising:
  a single-frequency continuous-wave laser source for generating a fundamental wave;

a resonant external cavity receiving this fundamental wave, called the microchip cavity;

said microchip cavity is composite in so far as this microchip cavity is a unitary assembly of a plurality of materials comprising:

at least one nonlinear crystal;

an entrance mirror;

a concave mirror deposited on a material that is directly fastened to the at least one nonlinear crystal; the material on which the concave mirror is deposited is different from the constituent material of the at least one nonlinear crystal; and a first thermoelectric module for controlling the temperature of the at least one nonlinear crystal and at least one second thermoelectric module for controlling at least the temperature of the material on which the concave mirror is deposited.

2. The system as claimed in claim 1, further comprising a processing unit configured to servocontrol the temperature of the nonlinear crystal and the temperature at least of the material on which the concave mirror is deposited to the frequency of the laser source.

3. The system as claimed in claim 2, wherein the processing unit is configured to lock the temperature servocontrol only to at least one side of the resonant curve.

4. The system as claimed in claim 1, further comprising a processing unit configured to carry out a servocontrol using any physical effect that modifies the frequency of the emitting laser or the phase of the fundamental wave in the external cavity and that is faster than servocontrol.

5. The system as claimed in claim 1, further comprising a processing unit configured to servocontrol the phase of the fundamental wave in the external cavity by modifying the frequency of the single-frequency continuous-wave laser source.

6. The system as claimed in claim 1, wherein when the nonlinear crystal is an electro-optic crystal, and further comprising a processing unit configured to carry out an electro-optic servocontrol by applying a voltage directly to the nonlinear crystal.

7. The system as claimed in claim 1, wherein the microchip cavity is an external cavity forming a Fabry-Perot interferometer.

8. The system as claimed in claim 1, wherein the microchip cavity is an external ring cavity.

9. The system as claimed in claim 1, wherein the microchip cavity is an external cavity forming an interferometer the reflectivity of which is maximum during resonance.

10. The system as claimed in claim 1, wherein the material on which the concave mirror is deposited is a glass or crystal, with a thermal expansion coefficient and thermo-optic coefficients respectively lower than those of the constituent material of the nonlinear crystal and a hygroscopicity lower than that of the constituent material of the nonlinear crystal.

11. The system as claimed in claim 1, wherein the material on which the concave mirror is deposited comprises silica or fused silica or sapphire.

12. The system as claimed in claim 1, wherein the nonlinear crystal and the material on which the concave mirror is deposited are assembled by direct bonding or by bonding using a sol-gel process.

13. The system as claimed in claim 1, wherein the entrance mirror is deposited directly on the constituent material of the nonlinear crystal or indeed on another material different from that of the nonlinear crystal.

* * * * *